(12) United States Patent
Bandyopadhyay et al.

(10) Patent No.: US 9,714,624 B2
(45) Date of Patent: Jul. 25, 2017

(54) ENGINE SYSTEM FOR REDUCING GASEOUS FUEL SLIP

(71) Applicant: Electro-Motive Diesel, Inc., LaGrange, IL (US)

(72) Inventors: Deep Bandyopadhyay, Naperville, IL (US); John P. Timmons, Chillicothe, IL (US); David Todd Montgomery, Edelstein, IL (US); Aaron Gamache Foege, Westmont, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 78 days.

(21) Appl. No.: 14/678,543

(22) Filed: Apr. 3, 2015

(65) Prior Publication Data

US 2016/0290243 A1    Oct. 6, 2016

(51) Int. Cl.
| | | |
|---|---|---|
| *F02D 41/14* | (2006.01) | |
| *F02D 13/02* | (2006.01) | |
| *F02D 19/02* | (2006.01) | |
| *F02B 25/14* | (2006.01) | |
| *F02D 19/10* | (2006.01) | |
| *F02D 41/00* | (2006.01) | |

(52) U.S. Cl.
CPC ........ *F02D 41/1444* (2013.01); *F02B 25/145* (2013.01); *F02D 13/0203* (2013.01); *F02D 13/0242* (2013.01); *F02D 13/0284* (2013.01); *F02D 19/024* (2013.01); *F02D 19/10* (2013.01); *F02D 41/0027* (2013.01); *F02D 41/0025* (2013.01)

(58) Field of Classification Search
CPC .. F02B 23/10; F02B 23/104; F02B 2075/025; F02D 13/00; F02D 13/02; F02D 13/0203; F02D 19/061; Y02T 10/44
USPC ....... 123/65 P, 65 PE, 65 WV, 445, 469–472
See application file for complete search history.

(56) References Cited

U.S. PATENT DOCUMENTS

| | | | | |
|---|---|---|---|---|
| 2,691,968 | A | * 10/1954 | Barber | ...... F02B 3/02 123/301 |
| 4,876,988 | A | * 10/1989 | Paul | ...... F02B 43/00 123/1 A |
| 5,005,539 | A | * 4/1991 | Kawamura | ...... F01L 9/04 123/21 |

(Continued)

FOREIGN PATENT DOCUMENTS

| | | |
|---|---|---|
| DE | 102010048823 A1 | 4/2012 |
| WO | WO 2013/068640 A1 | 5/2013 |

(Continued)

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

An engine system is disclosed. The engine system may have an engine including at least one cylinder. Further, the engine system may have a nozzle configured to selectively inject gaseous fuel into the at least one cylinder of the engine. The engine system may also have an intake port configured to direct air for combustion to the at least one cylinder. In addition, the engine system may have exhaust valves associated with the at least one cylinder. The exhaust valves may be configured to direct exhaust from the cylinder to an atmosphere. The exhaust valves may also be configured to close at different times.

19 Claims, 4 Drawing Sheets

(56) References Cited

U.S. PATENT DOCUMENTS

| | | | |
|---|---|---|---|
| 2001/0022168 A1* | 9/2001 | Teraji | F02B 1/12 |
| | | | 123/295 |
| 2006/0016419 A1* | 1/2006 | Kono | F02D 37/02 |
| | | | 123/298 |
| 2008/0149063 A1* | 6/2008 | Denger | F01L 3/06 |
| | | | 123/193.6 |
| 2013/0325295 A1 | 12/2013 | Klingbeil | |
| 2014/0116375 A1 | 5/2014 | Kim et al. | |
| 2014/0299100 A1 | 10/2014 | Goetzke et al. | |

FOREIGN PATENT DOCUMENTS

| | | |
|---|---|---|
| WO | WO 2013/117942 A2 | 8/2013 |
| WO | WO 2014/167177 A1 | 10/2014 |

\* cited by examiner

ENGINE SYSTEM FOR REDUCING GASEOUS FUEL SLIP

TECHNICAL FIELD

The present disclosure relates generally to an engine system, and, more particularly, to an engine system for reducing gaseous fuel slip.

BACKGROUND

Internal combustion engines generate exhaust as a by-product of fuel combustion within the engines. Engine exhaust contains, among other things, un-burnt fuel, particulate matter such as soot, and harmful gases such as carbon monoxide or nitrous oxide. To comply with regulatory emissions control requirements, it is desirable to reduce the amount of soot and harmful gases generated by the engine. Due to the rising cost of liquid fuel (e.g. diesel fuel) and to comply with the emissions control requirements, engine manufacturers have developed dual-fuel engines. Using a lower-cost fuel together with liquid fuel helps improve the cost efficiency of the engine. Further, combustion of the gaseous fuel and liquid fuel mixture lowers the production of undesirable emissions from the engine.

In an exemplary dual-fuel engine, the gaseous fuel may be introduced into combustion chambers of the engine during an intake stroke. Because exhaust valves of the combustion chambers may remain open for a portion of the intake stroke, some of the gaseous fuel can escape or "slip" out through the open exhaust valves. The fuel that escapes from the combustion chambers does not participate in combustion, reducing the efficiency of the engine. Additionally, the escaping un-burnt gaseous fuel contributes to the total amount of undesirable emissions produced by the engine.

One technique for reducing gaseous fuel slip from the combustion chambers is disclosed in International Publication No. WO 2013/0686640 to Häglund ("the '640 publication") that published on May 16, 2013. The '640 publication discloses various embodiments to remove and treat un-burnt gaseous fuel trapped in dead volumes in the combustion chamber where no combustion occurs. The '640 publication discloses an arrangement of conduits that removes a portion of the exhaust containing the un-burnt gaseous fuel separately from the remaining portion of the exhaust. The '640 publication also discloses a processing unit for treating the portion of the exhaust containing the un-burnt gaseous fuel. The treated exhaust is then allowed to mix with the remainder of the exhaust.

Although the '640 publication discloses the use of a processing unit to treat un-burnt gaseous fuel for improving engine emissions, the disclosed apparatus and method may still not be optimal. In particular, the disclosed apparatus of the '640 publication removes the un-burnt gaseous fuel after completion of combustion in the engine cylinders. Thus the un-burnt gaseous fuel does not contribute to generation of power in the engine, reducing the efficiency of the engine. Further, the disclosed apparatus of the '640 publication requires the use of additional ducting and the use of a processing unit, which may increase the cost of manufacturing and operating the engine.

The engine system of the present disclosure solves one or more of the problems set forth above and/or other problems in the art.

SUMMARY

In one aspect, the present disclosure is directed to an engine system. The engine system may include an engine including at least one cylinder. Further, the engine system may include a nozzle configured to selectively inject gaseous fuel into the at least one cylinder of the engine. The engine system may also include an intake port configured to direct air for combustion to the at least one cylinder. In addition, the engine system may include exhaust valves associated with the at least one cylinder. The exhaust valves may be configured to direct exhaust from the at least one cylinder to an atmosphere. The exhaust valves may also be configured to close at different times.

In another aspect, the present disclosure is directed to a method for reducing gaseous fuel slip. The method may include opening exhaust valves associated with at least one cylinder of an engine to allow exhaust gases to exit the engine. The method may further include opening at least one intake port during an intake stroke to allow air to enter the at least one cylinder of the engine. The method may also include selectively injecting gaseous fuel into the at least one cylinder of the engine. In addition, the method may include closing the exhaust valves at different times In yet another aspect, the present disclosure is directed to an engine. The engine may include an engine block. The engine may also include a cylinder head. Further, the engine may include a crankshaft disposed within the engine block. The engine may also include at least one cylinder pack. The cylinder pack may include a cylinder extending from a cylinder head end to a crankshaft end. The cylinder may be attached to the cylinder head at the cylinder head end. The cylinder pack may also include an intake port disposed on a side wall of the cylinder and configured to direct air for combustion into the cylinder. The cylinder pack may further include a piston reciprocatingly disposed within the cylinder. The cylinder pack may also include a connecting rod connected at a first rod end to the piston and connected at a second rod end to the crank shaft. The engine may include a nozzle configured to inject gaseous fuel into the cylinder. The nozzle may be disposed on the side wall opposite the intake port. In addition, the engine may include exhaust valves associated with the cylinder. The exhaust valves may be configured to direct exhaust from the cylinder to an atmosphere. The exhaust valves may also be configured to close at different times.

DETAILED DESCRIPTION

Figure 1:
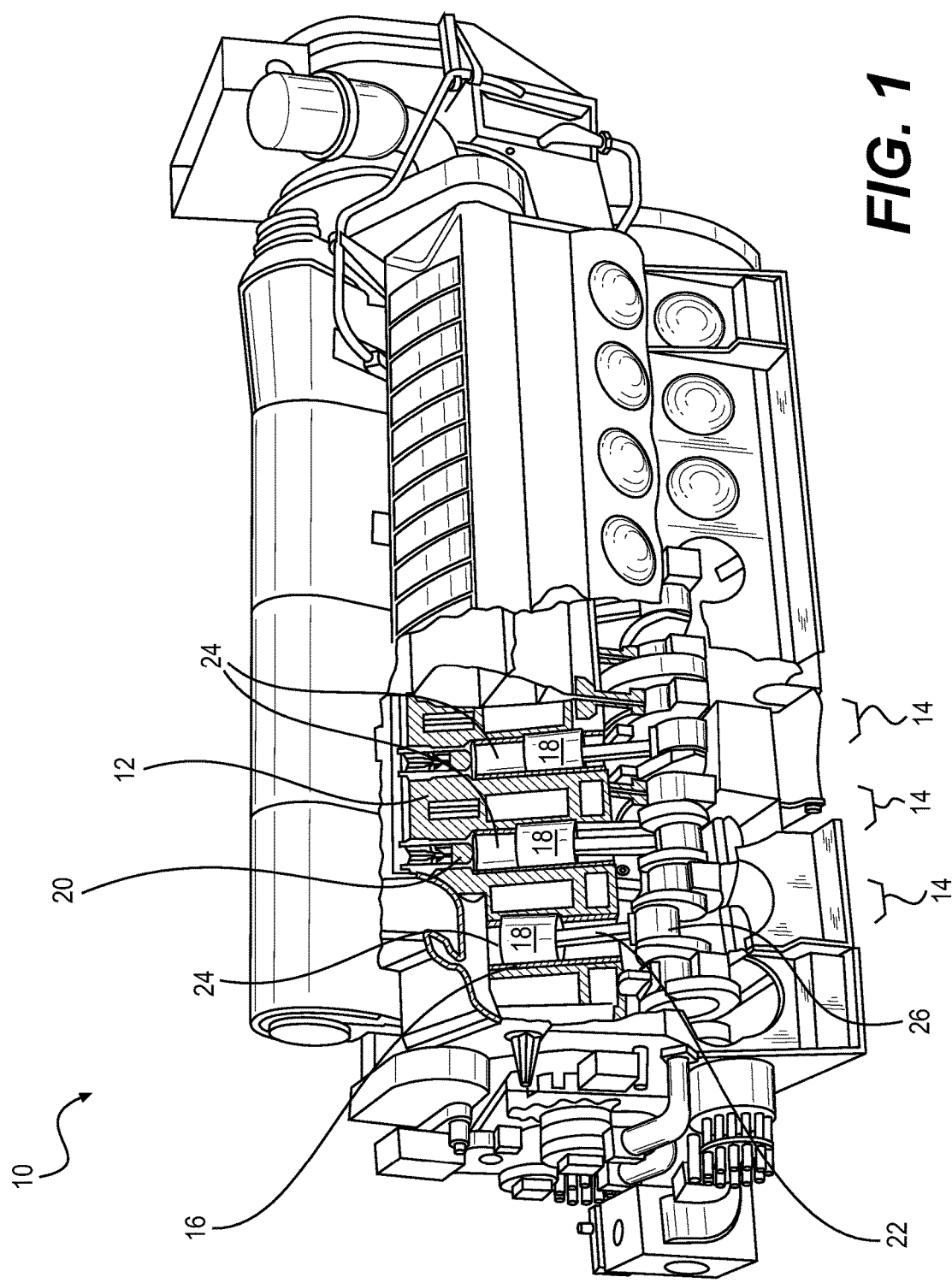
FIG. 1 is a diagrammatic illustration of an exemplary disclosed engine.

FIG. 1 illustrates an exemplary internal combustion engine 10. Engine 10 may be a two-stroke diesel engine. One skilled in the art will recognize, however, that engine 10 may be any other type of internal combustion engine such as, for example, a dual-fuel powered four-stroke diesel engine or gasoline engine, or a gaseous-fuel-powered engine. Engine 10 may include an engine block 12 that at least partially defines a plurality of cylinder packs 14. Each cylinder pack 14 may include a cylinder 16, a piston 18 slidably disposed within cylinder 16, a cylinder head 20 attached to cylinder 16, and a connecting rod 22. Cylinder 16, piston 18, and cylinder head 20 may form a combustion chamber 24. In the embodiment illustrated in FIG. 1, engine 10 includes sixteen cylinder packs 14. It is contemplated, however, that engine 10 may include a greater or lesser number of cylinder packs 14. Moreover, cylinder packs 14 in engine 10 may be disposed in an "in-line" configuration, a "V" configuration (as shown in FIG. 1), or in any other suitable configuration.

As also shown in FIG. 1, engine 10 may include a crankshaft 26 rotatably disposed within engine block 12. Connecting rods 22 may connect pistons 18 to crankshaft 26. The reciprocal movement of pistons 18 within cylinders 16 may be transferred to a rotational movement of crankshaft 26 by connecting rods 22. Similarly, the rotation of crankshaft 26 may be transferred as a reciprocating movement of pistons 18 within cylinders 16 by connecting rods 22.

Figure 2:
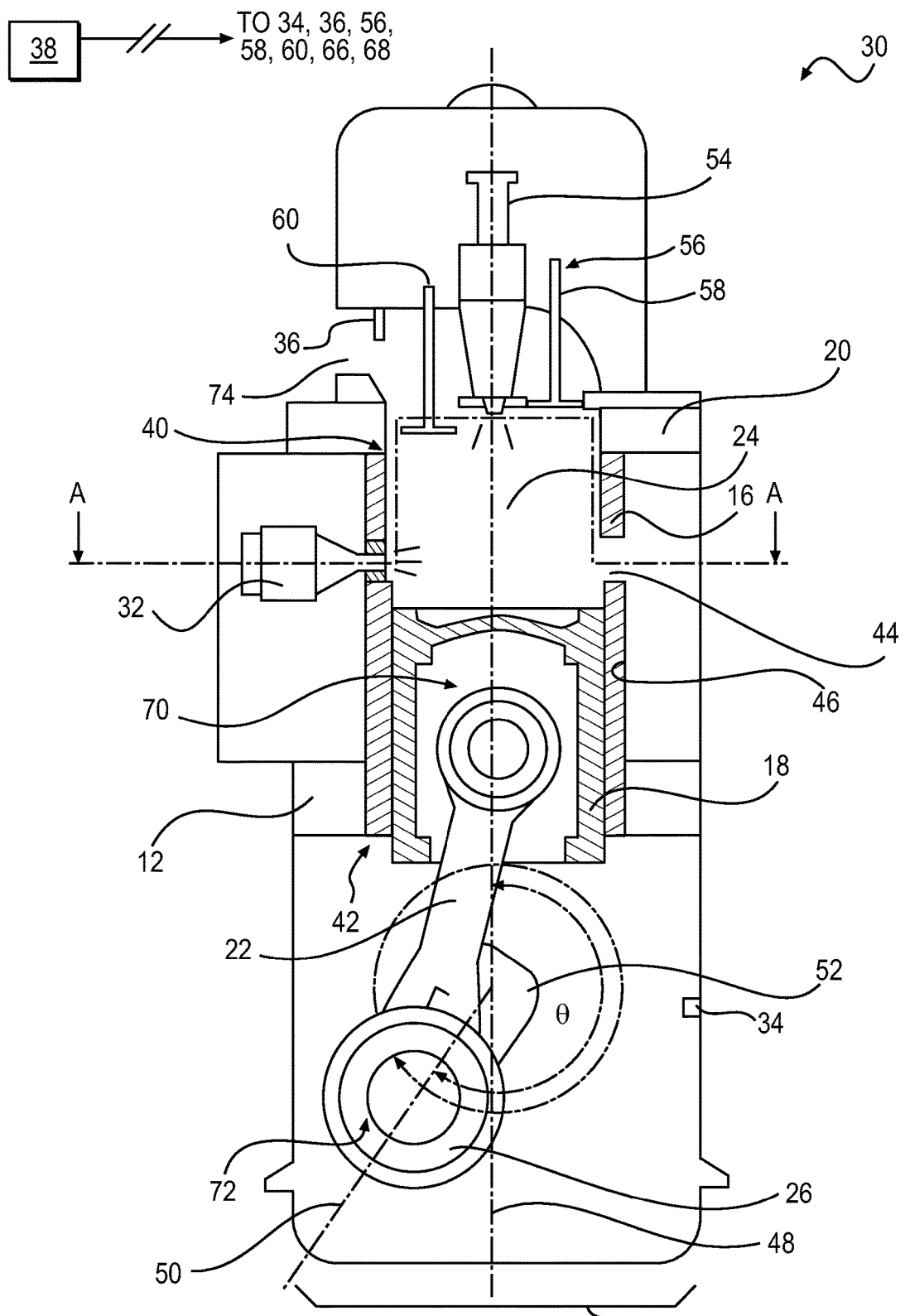
FIG. 2 is a diagrammatic illustration of an exemplary disclosed engine system associated with the engine of FIG. 1.

FIG. 2 illustrates an exemplary engine system 30 for engine 10. Engine system 30 may include cylinder pack 14, nozzle 32, crank angle sensor 34, gaseous fuel sensor 36, and controller 38. Although FIG. 2 illustrates only one cylinder pack 14 and one controller 38, one of ordinary skill in the art would recognize that engine system 30 may include any number of cylinder packs 14 and/or controllers 38. Cylinder pack 14 may include a cylinder 16 extending axially from a cylinder head end 40 disposed adjacent cylinder head 20 to a crankshaft end 42 disposed adjacent crankshaft 26. Cylinder 16 may have a generally cylindrical shape and a generally circular cross-section. It is contemplated, however, that cylinder 16 may have an elliptical or any other suitable cross-section known in the art. Cylinder 16 may include at least one intake port 44 disposed on side wall 46. Intake port 44 may be configured to direct air for combustion of fuel in combustion chamber 24 of cylinder 16. Although only one intake port 44 is illustrated in FIG. 2, it is contemplated that cylinder 16 may have more than one intake port 44 disposed on side wall 46.

Nozzle 32 may be disposed on side wall 46 of cylinder 16. In one exemplary embodiment, nozzle 32 may be disposed at a location generally diametrically opposite to intake port 44. It is contemplated, however, that nozzle 32 may be disposed anywhere on side wall 46 of cylinder 16. Nozzle 32 may be configured to inject gaseous fuel into combustion chamber 24 of cylinder 16. In one exemplary embodiment, nozzle 32 may have a pressurized chamber (not shown) configured to contain a volume of pressurized gaseous fuel. Nozzle 32 may further include a needle valve element (not shown) slidably disposed within the pressurized chamber. The needle valve element may move to allow pressurized fuel to flow from the pressurized chamber into combustion chamber 24 of cylinder 16. In one exemplary embodiment, the needle valve element may be actuated using a solenoid. It is contemplated, however, that needle valve element may be actuated mechanically, hydraulically, magnetically, or by any other method of actuation known in the art. In one exemplary embodiment as illustrated in FIG. 2, nozzle 32 and/or intake ports 44 may be disposed nearer to cylinder head end 40 as compared to crankshaft end 42.

Piston 18 may be slidably disposed within cylinder 16. Piston 18 may be configured to move reciprocally between a top-dead-center (TDC) position adjacent cylinder head end 40 and a bottom-dead-center (BDC) position adjacent crankshaft end 42. An axial position of piston 18 in cylinder 16 may also be represented by a crank angle θ. Crank angle θ as used in this disclosure is an angle between a longitudinal axis 48 of cylinder 16 and a longitudinal axis 50 of crankshaft arm 52 measured in a clockwise direction from longitudinal axis 48.

Cylinder head 20 may be connected to cylinder 16 at cylinder head end 40. Cylinder head 20 may include one or more fuel injectors 54 for injecting liquid fuel into combustion chamber 24. Cylinder head 20 may also include one or more exhaust valves 56 associated with cylinder 16. Exhaust valves 56 may be configured to allow exhaust gases to exit combustion chamber 24 of cylinder 16 during a scavenging operation after combustion. In one exemplary embodiment as illustrated in FIG. 2, cylinder head 20 may include a first exhaust valve 58 and a second exhaust valve 60. First exhaust valve 58 may be disposed nearer to intake port 44 than to nozzle 32. Second exhaust valve 60 may be disposed nearer to nozzle 32 than to intake port 44. Although fuel injectors 54 and exhaust valves 56, 58, 60 have been described as being disposed on cylinder head 20, it is contemplated that fuel injectors 54 and exhaust valves 56, 58, 60 may be disposed on side wall 46 of cylinder 16.

Figure 3:
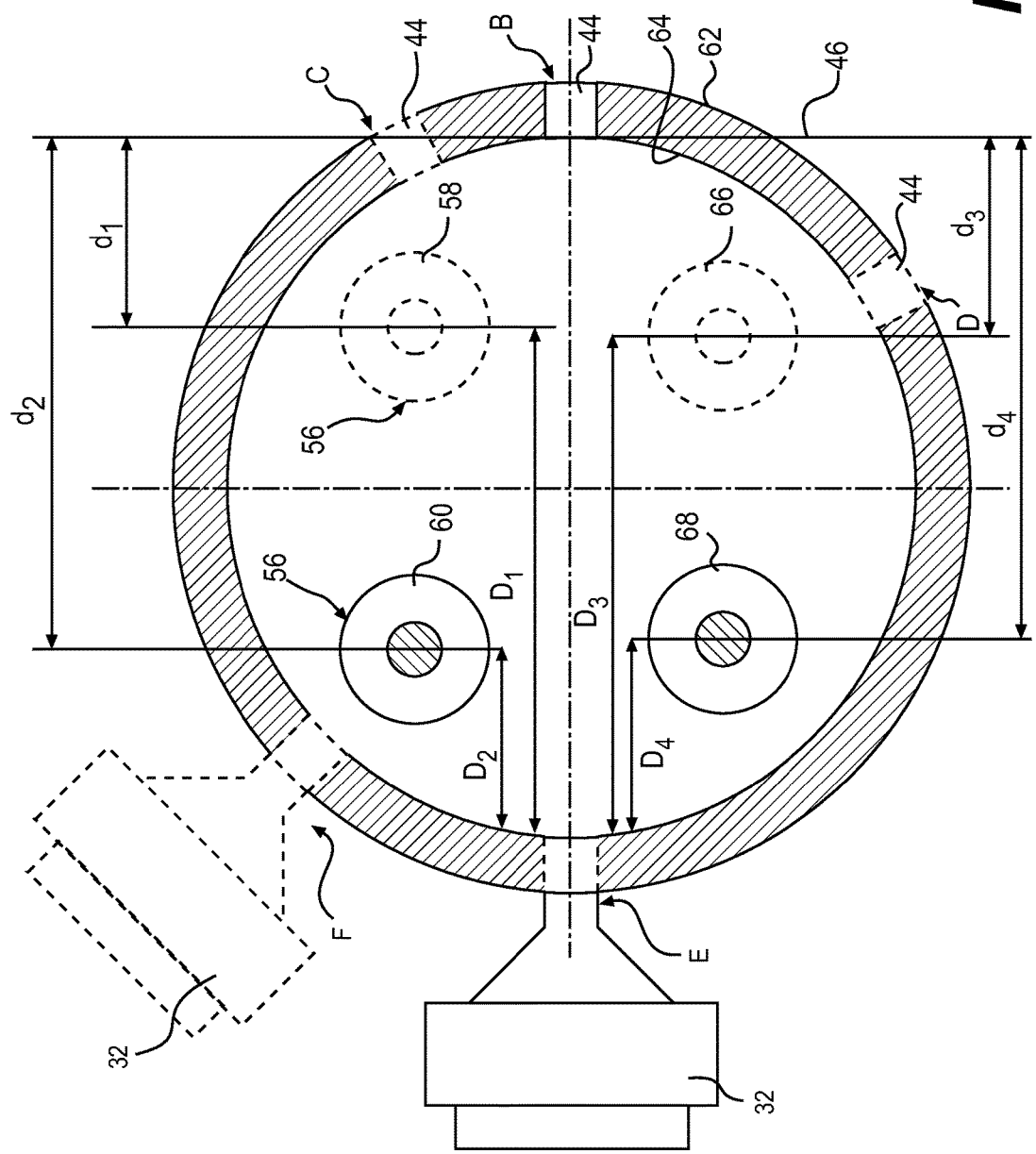
FIG. 3 is a cross-sectional view of an exemplary disclosed cylinder pack associated with the engine system of FIG. 2.

FIG. 3 illustrates an exemplary cross-sectional view of cylinder pack 14 along line A-A depicted in FIG. 2. As shown in FIG. 3, cylinder 16 may have an outer surface 62 and an inner surface 64. Intake port 44 may extend through side wall 46 of cylinder 16 from outer surface 62 to inner surface 64. Intake port 44 may be located at any circumferential location on side wall 46. For example, as shown in FIG. 3, intake port 44 may be located at one or more of positions B, C (shown in phantom), or D (shown in phantom). Nozzle 32 may also be located at any circumferential location on side wall 46. For example, as shown in FIG. 3, nozzle 32 may be located at one or more of positions E or F (shown in phantom). First exhaust valve 58 may be located nearer to intake port 44 than to nozzle 32. For example, as illustrated in FIG. 3, first exhaust valve 58 may be located at diametrical distance "$d_1$" from air intake port 44 and at a diametrical distance "$D_1$" from nozzle 32. As used in this disclosure, diametrical distance is a distance measured from a location on inner surface 64 of cylinder 16 along a diameter passing through that location. In one exemplary embodiment as illustrated in FIG. 3, diametrical distance $d_1$ may be smaller than diametrical distance $D_1$. Second exhaust valve 60 may be located at a diametrical distance "$d_2$" from intake port 44 and at a diametrical distance "$D_2$" from nozzle 32. In one exemplary embodiment as illustrated in FIG. 3, diametrical distance $d_2$ may be larger than diametrical distances $d_1$ and $D_2$.

As also illustrated in FIG. 3, cylinder pack 14 may have any number of exhaust valves 56. For example, FIG. 3 illustrates an exemplary cylinder pack 14 having four exhaust valves 56: first exhaust valve 58, second exhaust valve 60, third exhaust valve 66, and fourth exhaust valve 68. Third exhaust valve 66 may be located at a diametrical distance "$d_3$" from intake port 44 and at a diametrical distance "$D_3$" from nozzle 32. Similarly, fourth exhaust valve 68 may be located at a diametrical distance "$d_4$" from intake port 44 and at a diametrical distance "$D_4$" from nozzle 32. In one exemplary embodiment as illustrated in FIG. 3, diametrical distance $d_3$ may be smaller than diametrical distance $D_3$ and diametrical distance $d_4$ may be larger than diametrical distances $d_3$ and $D_4$. It is also contemplated that diametrical distances $d_1$, $D_1$, $d_2$, and $D_2$ may be the same as or different from diametrical distances $d_3$, $D_3$, $d_4$, and $D_4$, respectively.

Returning to FIG. 2, connecting rod 22 may have a first rod end 70 connected to piston 18 and a second rod end 72 connected to crankshaft 26 via crankshaft arm 52. Crankshaft 26 may be rotatably disposed within engine block 12 so that a sliding motion of piston 18 within cylinder 16 results in a rotation of crankshaft 26. Similarly, a rotation of crankshaft 26 may result in a sliding motion of piston 18. As the crankshaft rotates through about 180°, piston 18 may move through one full stroke between BDC and TDC. Thus, at the TDC position the crank angle θ will be 0° and at the BDC position crank angle θ will be 180°. As the crankshaft rotates through about 360°, engine 10, as a two-stroke engine, may undergo a complete combustion cycle that includes a power/exhaust/intake stroke (TDC to BDC) and an intake/compression stroke (BDC to TDC).

Crank-angle sensor 34 may be located on engine block 12. Crank-angle sensor 34 may be a Hall Effect sensor, an optical sensor, a magnetic sensor, or any other type of crank-angle sensor known in the art. Crank-angle sensor 34 may be configured to send signals indicative of crank angle θ between longitudinal axis 48 and longitudinal axis 50 to controller 38 during operation of engine 10. Crank-angle sensor 34 may also be configured to send signals indicative of a rotational speed of crankshaft 26 to controller 38. Although FIG. 2 illustrates only one crank-angle sensor 34, it is contemplated that engine system 30 may include any number of crank-angle sensors 34. It is also contemplated that one crank-angle sensor 34 may send signals indicative of crank angles θ for more than one piston 18. It is further contemplated that the signals sent by crank-angle sensor 34 to controller 38 may include information for identifying a particular piston 18 or cylinder pack 14 corresponding to each signal.

Gaseous fuel sensor 36 may be located in exhaust manifold 74. Gaseous fuel sensor 36 may be a physical gaseous fuel sensor, which may measure an amount of gaseous fuel present in exhaust manifold 74. In another exemplary embodiment, gaseous fuel sensor 36 may provide calculated values of gaseous fuel in exhaust manifold 74 based on other measured or calculated engine parameters, including but not limited to compression ratios, temperatures, pressures, fuel injection duration and timing, exhaust valve opening and closing duration and timing, ambient conditions, fuel injection rates, and/or engine speed. It is contemplated that gaseous fuel sensor 36 may embody other types of sensors known in the art to determine an amount gaseous fuel present in the exhaust exiting from engine 10.

Controller 38 may be configured to receive signals from crank-angle sensor 34 and gaseous fuel sensor 36. Although only two sensors have been discussed above, it is contemplated that controller 38 may receive signals from numerous other sensors associated with engine 10. For example, controller 38 may receive signals from temperature sensors, pressure sensors, flow rate sensors, torque sensors, speed sensors, and/or any other types of conventional sensors associated with engine 10. Controller 38 may be configured to control a timing and duration of the opening and closing of exhaust valves 56, and in particular the timing and duration of the opening and closing of first, second, third, and fourth exhaust valves 58, 60, 66, 68. In one exemplary embodiment, controller 38 may determine the timing for opening and closing exhaust valves 56, 58, 60, 66, 68 based on signals received from crank angle sensor 34 and/or gaseous fuel sensor 36. In another exemplary embodiment, controller 38 may determine the timing and duration of opening and closing exhaust valves 56, 58, 60, 66, 68 based on a variety of engine parameters. For example, these engine parameters may include a rotational speed of crankshaft 26, type and amount of fuel injected into combustion chamber 24, liquid fuel injection timing and duration, an amount of power being generated by engine 10, compression ratio of cylinder pack 14, and/or other engine parameters known in the art. Controller 38 may also use these engine parameters to determine how many of the first, second, third, and fourth exhaust valves 58, 60, 66, 68 to open during the intake stroke of piston 18.

Controller 38 may also be configured to determine a timing for initiating injection of gaseous fuel into combustion chamber 24 from one or more nozzles 32. Controller 38 may additionally be configured to determine a duration of gaseous fuel injection from the one or more nozzles 32. In one exemplary embodiment, controller 38 may determine the timing for and duration of gaseous fuel injection based on signals received from crank angle sensor 34 and/or gaseous fuel sensor 36. In another exemplary embodiment, controller 38 may determine the timing for and duration of gaseous fuel injection based on one or more of the engine parameters discussed above.

Controller 38 may embody a single or multiple microprocessors, field programmable gate arrays (FPGAs), digital signal processors (DSPs), etc. that include a means for controlling an operation of engine system 30 in response to signals received from the various sensors. Numerous commercially available microprocessors can be configured to perform the functions of controller 38. It should be appreciated that controller 38 could readily embody a microprocessor separate from that controlling other engine system functions, or that controller 38 could be integral with a general engine system microprocessor and be capable of controlling numerous engine system functions and modes of operation. If separate from the general engine system microprocessor, controller 38 may communicate with the general engine system microprocessor via data links or other methods. Various other known circuits may be associated with controller 38, including power supply circuitry, signal-conditioning circuitry, actuator driver circuitry (i.e., circuitry powering solenoids, motors, or piezo actuators), communication circuitry, and other appropriate circuitry.

INDUSTRIAL APPLICABILITY

The engine system of the present disclosure has wide applications in a variety of engine types including, for example, dual-fuel diesel engines and gasoline engines, and/or gaseous-fuel-powered engines. The disclosed engine system may be implemented into any engine wherein it may be advantageous to control the timing of opening and closing of the exhaust valves to reduce or eliminate gaseous fuel slip from the combustion chamber. The operation of engine system 30 will be discussed next.

Figure 4:
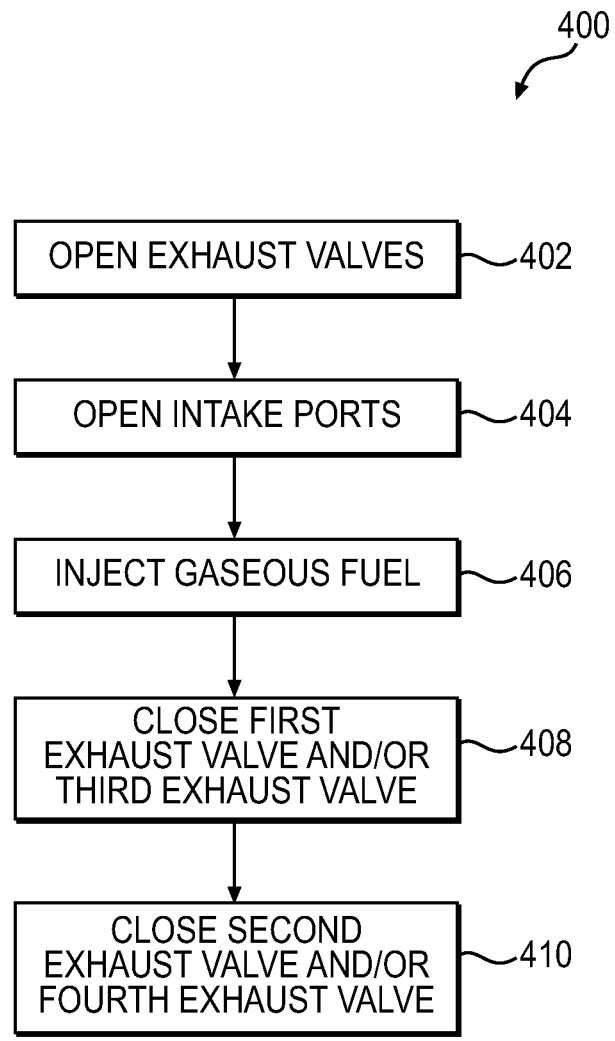
FIG. 4 is a flow chart illustrating an exemplary disclosed method performed by the engine system of FIG. 2.

FIG. 4 illustrates an exemplary method 400 of reducing gaseous fuel slip using engine system 30. In an exemplary engine system 30, including a two-stroke engine 10, a complete rotation of crankshaft 26 may include an intake stroke (TDC to BDC) and a compression stroke (BDC to TDC). Method 400 may include a step 402 of opening the exhaust valves 56 during the intake stroke of piston 18 (Step 402). Exhaust valves 56 may be opened during the intake stroke of piston 18 to allow exhaust gases to exit combustion chamber 24. In one exemplary embodiment, one or more of first, second, third, and fourth exhaust valves 58, 60, 66, 68 may be opened to allow the exhaust gases to exit combustion chamber 24. It is contemplated that first, second, third, and fourth exhaust valves 58, 60, 66, 68 may be opened simultaneously (i.e. at the same crank angle) or at different times (i.e. at different crank angles). In one exemplary embodiment, one of more of first, second, third, and fourth exhaust valves 58, 60, 66, 68 may be opened using cams or other actuation mechanisms known in the art driven by power supplied from crankshaft 26.

In another exemplary embodiment, one of more of first, second, third, and fourth exhaust valves 58, 60, 66, 68 may be opened based on signals received from controller 38. For example, controller 38 may receive a signal indicative of a crank angle corresponding to a position of piston 18 from crank-angle sensor 34. Controller 38 may open one or more of first, second, third, and fourth exhaust valves 58, 60, 66, 68 based on the signals received from crank-angle sensor 34. Controller 38 may open the one or more of first, second, third, and fourth exhaust valves 58, 60, 66, 68 at the same crank angle or at different crank angles. Controller 38 may determine the crank angles at which to open one or more of first, second, third, and fourth exhaust valves 58, 60, 66, 68 based on one or more of the engine parameters described above. Controller 38 may also use these engine parameters to determine how many of the first, second, third, and fourth exhaust valves 58, 60, 66, 68 to open during the intake stroke of piston 18.

Method 400 may include a step 404 of opening the intake ports (Step 404). For example, as piston 18 moves from TDC to BDC within cylinder 16, piston 18 may reach a position at which intake ports 44 may no longer be blocked by piston 18, allowing air to enter combustion chamber 24. Air entering combustion chamber 24 through intake ports 44 may help drive exhaust gases out of combustion chamber 24 through the one or more open exhaust valves 56, 58, 60, 66, 68. Method 400 may also include a step 406 of injecting gaseous fuel into combustion chamber 24 of cylinder 16 (Step 406). For example, during the intake stroke of piston 18, gaseous fuel may be injected into combustion chamber 24 through one or more nozzles 32. In one exemplary embodiment, nozzles 32 may be activated using cams or other actuation mechanisms known in the art driven by power supplied from crankshaft 26. In another exemplary embodiment, nozzles 32 may be activated based on signals received from controller 38. Controller 38 may determine injection parameters such as injection pressure, timing of injection (i.e. crank angle at which the gaseous fuel may be injected), a duration of injection of gaseous fuel, etc., based on one or more of the engine parameters discussed above.

Before, during, or after injection of gaseous fuel into combustion chamber 24, engine system 30 may close one or more of first, second, third, and fourth exhaust valves 58, 60, 66, 68 to prevent the injected gaseous fuel from escaping from combustion chamber 24 through the one or more open first, second, third, and fourth exhaust valves 58, 60, 66, 68. Method 400 may include a step 408 of closing first exhaust valve 58 and/or third exhaust valve 66 (Step 408). For example, in step 408, engine system 30 may close first exhaust valve 58 at a first crank angle $\theta_1$ and/or third exhaust valve 66 at a third crank angle $\theta_3$ while keeping second exhaust valve 60 and/or fourth exhaust valve 66 open (see FIGS. 2, 3). By closing first exhaust valve 58 before second exhaust valve 60 and/or by closing third exhaust valve 66 before fourth exhaust valve 68, engine system 30 may help reduce an amount of gaseous fuel slip through first exhaust valve 58 and/or third exhaust valve 66. In particular, in the exemplary embodiment illustrated in FIG. 2, as gaseous fuel enters combustion chamber 24 from nozzle 32, air entering combustion chamber 24 from intake port 44 may help drive a plume of gaseous fuel to flow towards first exhaust valve 58 and third exhaust valve 66 along side wall 46. Because second exhaust valve 60 and fourth exhaust valve 68 are located further away from intake port 44 as compared to first exhaust valve 58 and third exhaust valve 66, a relatively smaller amount of gaseous fuel may flow towards second exhaust valve 60 and fourth exhaust valve 68. Thus, a concentration of gaseous fuel adjacent first exhaust valve 58 and third exhaust valve 66 may be higher than a concentration of gaseous fuel adjacent second exhaust valve 60 and fourth exhaust valve 68 because of the positional arrangement of nozzle 32, intake port 44, first exhaust valve 58, second exhaust valve 60, third exhaust valve 66, and fourth exhaust valve 68. Closing first exhaust valve 58 and/or third exhaust valve 66 may help reduce a flow of gaseous fuel from combustion chamber 24 out through first exhaust valve 58 and/or third exhaust valve 66. Simultaneously keeping second exhaust valve 60 and/or fourth exhaust valve 68 open may allow air entering combustion chamber 24 through intake port 44 to displace and drive residual exhaust from combustion chamber 24 out through second exhaust valve 60 and/or fourth exhaust valve 68.

Method 400 may include step 410 of closing second exhaust valve 60 and/or fourth exhaust valve 68 (Step 410). For example, engine system 30 may close second exhaust valve 60 at a second crank angle $\theta_2$ larger than the first crank angle $\theta_1$. Engine system 30 may also close fourth exhaust valve 68 at a fourth crank angle $\theta_4$ larger than third crank angle $\theta_3$. By closing first and second exhaust valves 58, 60 and/or by closing third and fourth exhaust valves 66, 68 at different times in this manner, engine system 30 may help reduce gaseous fuel slip from combustion chamber 24 of cylinder 16 without the need for additional ducting and/or a separate exhaust treatment unit to remove un-burnt gaseous fuel from the exhaust.

In one exemplary embodiment, first, second, third, and fourth crank angles $\theta_1$, $\theta_2$, $\theta_3$, $\theta_4$ may be determined by controller 38. Controller 38 may determine the first, second, third, and fourth crank angles $\theta_1$, $\theta_2$, $\theta_3$, $\theta_4$ based on one or more of the engine parameters discussed above. Controller 38 may also direct first exhaust valve 58 to close at first crank angle $\theta_1$ and direct second exhaust valve 60 to close at second crank angle $\theta_2$. Although second crank angle $\theta_2$ has been described as being greater than first crank angle $\theta_1$, it is contemplated that in some exemplary embodiments, first crank angle $\theta_1$ may be about equal to second crank angle $\theta_2$. As used in this disclosure the phrase "about equal" indicates equality within manufacturing tolerances. For example, first crank angle $\theta_1$ may be deemed to be about equal to second crank angle $\theta_2$ when first crank angle $\theta_1$ and second crank angle $\theta_2$ differ by at most 0.1° to 0.5°. Likewise, although fourth crank angle $\theta_4$ has been described as being greater than third crank angle $\theta_3$, it is contemplated that in some exemplary embodiments, third crank angle $\theta_3$ may be about equal to fourth crank angle $\theta_4$. It is also contemplated that a crank angle difference "$\Delta\theta$" between first crank angle $\theta_1$ and second crank angle $\theta_2$ may be the same or different for each cylinder pack 14 in engine 10.

Referring to the exemplary embodiment of FIG. 3, engine system 30 may close first, second, third, and fourth exhaust valves 58, 60, 66, 68 at different times. For example, engine system 30 may close first and third exhaust valves 58, 66 before closing second and fourth exhaust valves 60, 68. Engine system 30 may close first and third exhaust valves 58, 66 simultaneously or at different times. Likewise, engine system 30 may close second and fourth exhaust valves 60, 68 simultaneously or at different times. Thus, for example, engine system 30 may close first exhaust valve 58 at first crank angle $\theta_1$, second exhaust valve 60 at second crank angle $\theta_2$, third exhaust valve 66 at third crank angle $\theta_3$, and fourth exhaust valve 68 at fourth crank angle $\theta_4$. In one exemplary embodiment, first and third crank angles $\theta_1$ and $\theta_3$ may be smaller than second and fourth crank angles $\theta_2$ and $\theta_4$. Additionally or alternatively, in another exemplary embodiment first crank angle $\theta_1$ may be different from third crank angle $\theta_3$ and second crank angle $\theta_2$ may be different from fourth crank angle $\theta_4$.

Further, a crank angle difference "$\Delta\theta_1$" between first crank angle $\theta_1$ and second crank angle $\theta_2$ may be the same or different for each cylinder pack 14 in engine 10. Likewise, a crank angle difference "$\Delta\theta_2$" between third crank angle $\theta_3$ and fourth crank angle $\theta_4$ may be the same or different for each cylinder pack 14 in engine 10. It is also contemplated that crank angle difference $\Delta\theta_1$ may be the same as or different from crank angle difference $\Delta\theta_2$ for any cylinder pack 14.

As piston 18 moves from the BDC to the TDC position, during a compression stroke, intake ports 44 may be blocked by piston 18 cutting off intake of fresh air into combustion chamber 24. Liquid fuel may be injected into combustion chamber 24 before, during, or after the air is drawn into combustion chamber 24. First, second, third, and fourth exhaust valves 58, 60, 66, 68 may be closed and further upward motion of piston 18 during the compression stroke may compress the fuel/air mixture trapped in combustion chamber 24. As the fuel/air mixture within combustion chamber 24 is compressed, the temperature of the mixture may increase. Eventually, the pressure and temperature of the mixture may reach a point at which the mixture may combust, pushing piston 18 away from the TDC position towards the BDC position causing crankshaft 26 to rotate. At a particular point during the travel of piston 18 from the TDC position to the BDC position, one or more exhaust valves 56, 58, 60, 66, 68 disposed within cylinder head 20 may open (Step 402) to allow pressurized exhaust within combustion chamber 24 to exit and the entire process may then be repeated during continuous operation of engine 10.

It will be apparent to those skilled in the art that various modifications and variations can be made to the disclosed engine system without departing from the scope of the disclosure. Other embodiments of the engine system will be apparent to those skilled in the art from consideration of the specification and practice of the engine system disclosed herein. It is intended that the specification and examples be considered as exemplary only, with a true scope of the disclosure being indicated by the following claims and their equivalents.

What is claimed is:

1. An engine system, comprising:
    an engine including at least one cylinder having a side wall;
    a nozzle disposed on the side wall and configured to selectively inject a gaseous fuel into the at least one cylinder of the engine;
    an intake port defined by the side wall and configured to direct air for combustion into the at least one cylinder;
    a first exhaust valve and a second exhaust valve associated with the at least one cylinder and configured to direct exhaust from the at least one cylinder to an atmosphere surrounding the engine, the second exhaust valve being located closer to the nozzle than the first exhaust valve; and
    a controller operatively coupled to the first exhaust valve and the second exhaust valve, the controller being configured to close the first exhaust valve at a first timing and close the second exhaust valve at a second timing, the second timing occurring after the first timing during one cycle of the at least one cylinder.

2. The engine system of claim 1, wherein the first exhaust valve is configured to open at a third timing, and the second exhaust valve is configured to open at a fourth timing, the third timing being about the same as the fourth timing during the one cycle of the at least one cylinder.

3. The engine system of claim 1, wherein the at least one cylinder extends from a cylinder head end to a crankshaft end,
    the first exhaust valve and the second exhaust valve are disposed adjacent the cylinder head end, and
    the nozzle is disposed further from the cylinder head end than the first exhaust valve and the second exhaust valve along a longitudinal axis of the at least one cylinder.

4. The engine system of claim 3, further comprising a fuel injector that is configured to selectively inject a liquid fuel into the at least one cylinder, the fuel injector being disposed adjacent the cylinder head end.

5. The engine system of claim 4, further including a cylinder head attached to the at least one cylinder at the cylinder head end, wherein the fuel injector, the first exhaust valve, and the second exhaust valve are disposed in the cylinder head.

6. The engine system of claim 5, wherein
    the first exhaust valve is disposed at a first diametrical distance from the intake port, and
    the second exhaust valve is disposed at a second diametrical distance from the intake port, the second diametrical distance being larger than the first diametrical distance.

7. The engine system of claim 1, wherein the intake port is diametrically opposed to the nozzle.

8. The engine system of claim 1, wherein the at least one cylinder defines four distinct quadrants, including a first quadrant, a second quadrant, a third quadrant, and a fourth quadrant,
    the first exhaust valve is located in the first quadrant,
    the intake port is located in at least one of the first quadrant and the second quadrant, the first quadrant being adjacent to the second quadrant,
    the second exhaust valve is located in the fourth quadrant, and
    the nozzle is located in at least one of the third quadrant and the fourth quadrant, the third quadrant being adjacent to the fourth quadrant.

9. The engine system of claim 8, wherein the intake port is not located in either of the third quadrant and the fourth quadrant, and
    the nozzle is not located in either if the first quadrant and the second quadrant.

10. The engine system of claim 8, wherein the intake port is located partly in each of the first quadrant and the second quadrant, and
    the nozzle is located partly in each of the third quadrant and the fourth quadrant.

11. The engine system of claim 1, wherein the nozzle is in fluid communication with the at least one cylinder along a flow path that does not include the intake port.

12. A method for reducing gaseous fuel slip from an engine, the engine including
    at least one cylinder having a side wall,
    a nozzle disposed on the side wall and configured to selectively inject a gaseous fuel into the at least one cylinder,
    an intake port defined by the side wall and configured to direct air for combustion into the at least one cylinder, and a first exhaust valve and a second exhaust valve associated with the at least one cylinder and configured to direct exhaust from the at least one cylinder to an atmosphere surrounding the engine, the second exhaust valve being located closer to the nozzle than the first exhaust valve, the method comprising:

opening the first exhaust valve and the second exhaust valve to allow exhaust gases to exit the engine;

opening the intake port during an intake stroke to allow air to enter the at least one cylinder of the engine;

selectively injecting a gaseous fuel into the at least one cylinder of the engine via the nozzle;

closing the first exhaust valve at a first timing; and closing the second exhaust valve at a second timing, the second timing occurring after the first timing during one cycle of the at least one cylinder.

13. The method of claim 12, further comprising:

opening the first exhaust valve at a third timing; and opening the second exhaust valve at a fourth timing, the third timing being about the same as the fourth timing during the one cycle of the at least one cylinder.

14. The method of claim 13, wherein the third timing and the fourth timing are earlier than the first timing and the second timing, respectively, during the one cycle of the at least one cylinder.

15. An engine, comprising:

an engine block;

a cylinder head;

a crankshaft disposed within the engine block;

at least one cylinder pack, including:

a cylinder extending from a cylinder head end to a crankshaft end, the cylinder being attached to the cylinder head at the cylinder head end;

an intake port disposed on a side wall of the cylinder and configured to direct air for combustion into the cylinder;

a piston reciprocatingly disposed within the cylinder; and a connecting rod connected at a first rod end to the piston and connected at a second rod end to the crankshaft;

a fuel injector disposed adjacent the cylinder head end and configured to inject a liquid fuel into the cylinder;

a nozzle configured to inject a gaseous fuel into the cylinder, the nozzle being disposed on the side wall opposite the intake port; and a first exhaust valve and a second exhaust valve associated with the cylinder and configured to direct exhaust from the cylinder to an atmosphere surrounding the engine, the second exhaust valve being located closer to the nozzle than the first exhaust valve; and a controller operatively coupled to the first exhaust valve and the second exhaust valve, the controller being configured to close the first exhaust valve at a first timing and close the second exhaust valve at a second timing, the second timing occurring after the first timing during one cycle of the cylinder.

16. The engine of claim 15, wherein the cylinder further includes:

a third exhaust valve; and a fourth exhaust valve, wherein the fourth exhaust valve is located closer to the nozzle than the third exhaust valve, and wherein the controller is further configured to close the third exhaust valve at a third timing and close the fourth exhaust valve at a fourth timing, the fourth timing being later than the third timing during the one cycle of the cylinder.

17. The engine of claim 16, wherein the first timing is about the same as the third timing during the one cycle of the cylinder; and the second timing is about the same as the fourth timing during the one cycle of the cylinder.

18. The engine of claim 16, wherein the controller is further configured to open first exhaust valve, the second exhaust valve, the third exhaust valve, and the fourth exhaust valve at a fifth crank angle.

19. The engine of claim 16, wherein the at least one cylinder pack is a first cylinder pack, the engine further includes a second cylinder pack, including:

a fifth exhaust valve; and a sixth exhaust valve, the controller is further configured to close the fifth exhaust valve at a fifth timing and close the sixth exhaust valve at a sixth timing, the sixth timing being greater than the fifth timing, and a first crank angle difference between the first timing and the second timing is different from a second crank angle difference between the fifth timing and the sixth timing.

* * * * *